June 7, 1938.  C. H. PETERSON  2,119,513
HELICAL SPRING MACHINE
Filed Sept. 1, 1936  2 Sheets-Sheet 1
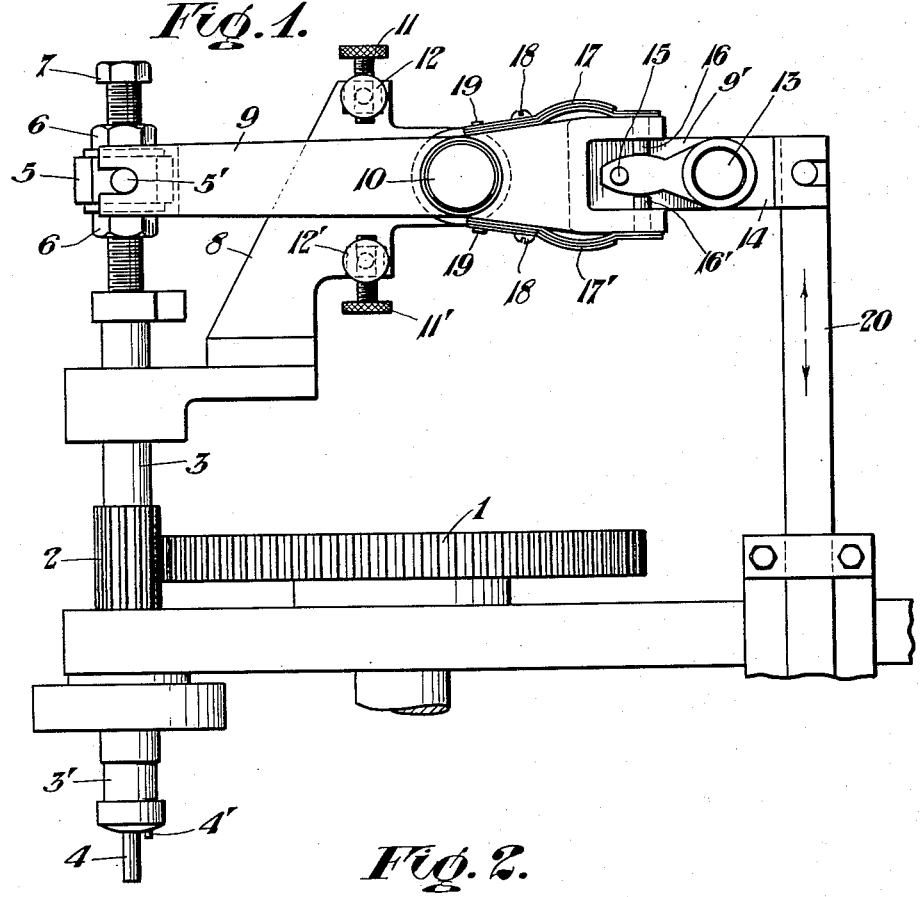
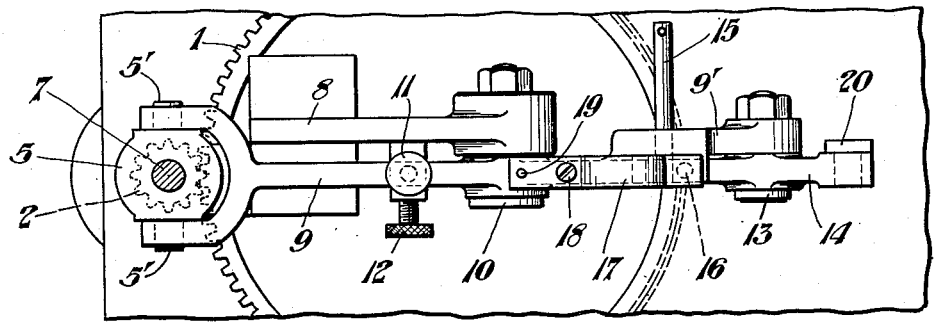
Inventor:
CARL H. PETERSON,
by Usina & Rauber
his Attorneys.

June 7, 1938.  C. H. PETERSON  2,119,513
HELICAL SPRING MACHINE
Filed Sept. 1, 1936  2 Sheets-Sheet 2
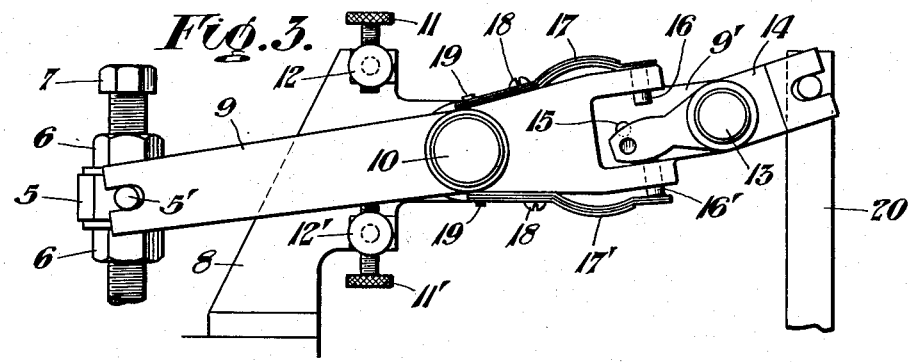
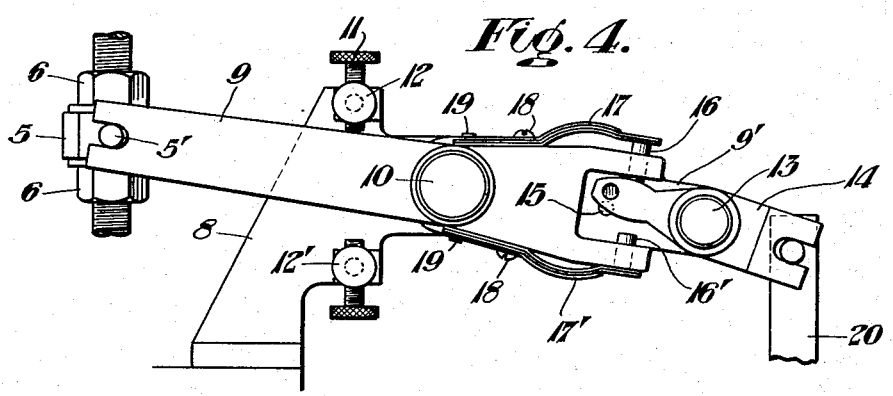
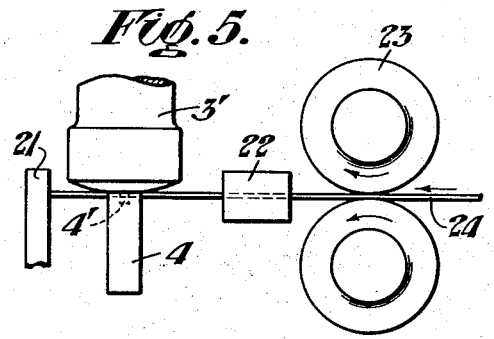
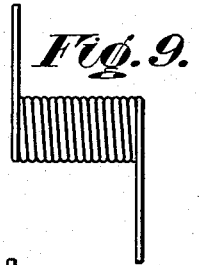
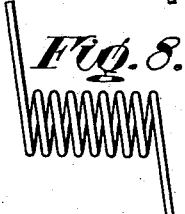
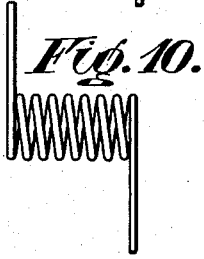
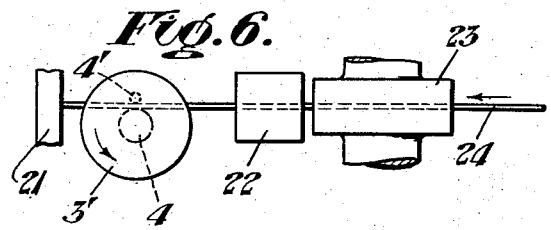
Inventor:
CARL H. PETERSON,
by his Attorneys.

Patented June 7, 1938

2,119,513

UNITED STATES PATENT OFFICE 2,119,513

HELICAL SPRING MACHINE

Carl H. Peterson, Worcester, Mass., assignor to The American Steel and Wire Company of New Jersey, a corporation of New Jersey Application September 1, 1936, Serial No. 98,945

14 Claims. (Cl. 153—67)

This invention relates to a machine for manufacturing springs, and more particularly to a machine for manufacturing helical springs having one or both of the end convolutions thereof disposed in planes normal to the longitudinal axis of their helices.

It is frequently desirable to provide helical springs with one or both of the end convolutions thereof lying in a plane that is substantially normal to the axis of the spring, to permit its interposition between plane parallel faces upon which tension or compression is to be applied. Hitherto, spring machines have been provided for winding helical springs, wherein the terminal convolutions are disposed at a pitch corresponding to the remaining convolutions therein, and constituting a continuation of the helix. Such springs are not adapted for interposition between spaced parallel surfaces, so that their axes fall substantially perpendicular to each of the surfaces and, hence, are not capable of applying uniform, direct compressive or expansive forces to such surfaces. A compression spring is especially given to twisting and malpositioning when its ends have not been squared.

The present invention has among its objects the provision of a device which may be applied to spring-making machines now in use, that will permit such machines to provide one or both of the end convolutions of a helical spring with "square ends"; i. e., ends being formed with the extreme convolutions disposed wholly within planes substantially perpendicular to the axis of the spring.

The foregoing and other objects will become apparent after referring to the accompanying drawings, in which:

Figure 1 represents a side elevation of one embodiment of the present invention.

Figure 2 is a plan of the device illustrated in Figure 1.

Figure 3 is a fragmentary side elevation illustrating the device during one phase of its operation.

Figure 4 is a view corresponding to Figure 3, but illustrating the device during another phase of its operation.

Figure 5 is a schematic elevation illustrating a wire being fed to the winding arbor preparatory to forming a spring.

Figure 6 is a plan of Figure 5.

Figures 7 and 8 are side views of springs manufactured in accordance with conventional methods.

Figures 9 and 10 are side views of springs manufactured in accordance with the present invention.

Referring more specifically to the drawings, in which like reference characters refer to like parts throughout:

The parts referred to by numbers 1 to 7 in the drawings represent a conventional form of spring manufacturing machine in which a gear 1 is driven to rotate a pinion 2 which is secured to a rotary shaft 3 in order to drive the same. The rotary shaft 3 has an arbor 3' and mandrel 4 at its lower end for forming springs.

In addition to the rotary movement imparted to the shaft 3 by the gear and pinion 1 and 2, respectively, it is adapted to be moved axially in a vertical direction by a rocker arm 9. To this end, a bearing member 5, having trunnions 5', is disposed about an upper extremity of the shaft 3, which is threaded to receive nuts 6 for positioning the bearing member 5 upon the shaft. The rocker arm 9 is pivoted by means of a stud 10 to a stationary support 8, and is adapted for oscillation between setscrews 11—11' carried by the support. These setscrews may be adjusted inwardly and outwardly relative to each other, to limit the movement of the rocker arm 9. Lock screws 12—12' are provided to retain the setscrews 11—11' in the desired position. One end of the arm 9 is clevised to provide a forked bearing to accommodate the bearing member 5 with its trunnions 5'.

At its opposite end, beyond the pivoting stud 10, the arm 9 is provided with an offset portion 9', which is constructed to accommodate the pivot member 13, upon which a lever 14 is carried in the plane of the arm 9. At its extremity adjacent the arm 9, the lever 14 is provided with a pin 15, which is adapted for removable engagement with an aperture in the offset portion 9', made to snugly receive the same. When the pin 15 is in engagement with the rocker arm, the lever 14 is held rigidly thereto, but when the pin 15 is withdrawn it may oscillate about the pivot 13 between retractable bearing members 16—16' carried by the arm 9.

The retractable bearing members 16—16' are reciprocably carried in extensions of the arm 9, which overlie and underlie the adjacent end of the lever 14, respectively, and are normally positioned to firmly bear against the lever by means of leaf springs 17—17' secured to the arm by fastenings 18 and 19. A shaft 20 is connected to the free end of the lever 14, which shaft is reciprocably driven synchronously with the gear 1 by a prime mover (not shown).

With reference to Figures 3 and 4, it will be seen that the shaft 20 is adapted to oscillate the rocker arm 9 about its pivoting stud 10 on the support 8. The pin 15 is withdrawn from engagement with the arm 9 so as to permit the lever 14 to oscillate about its pivotal axis 13 upon the arm 9. The upward extreme of the reciprocative movement of the arm 20 is such that, when the setscrew 11' is properly positioned to constrain the downward oscillation of the arm 9 within certain limits, the axis of the bearing the shaft 20 makes with the lever 14 is moved beyond the center line of the arm 9, whereby the lever 14 is pivoted about the pivot 13, with its outer end following the shaft 20 to the extremity of its stroke, and its inner end being depressed downwardly upon one of the bearing members 16 against the tension of the lower spring 17'. Figure 4 illustrates the various parts in the extreme opposite position from that illustrated in Figure 3 and described above.

Referring now to Figures 5 and 6, the operation of the device is substantially as follows: A wire 24, to be formed into a spring, is introduced through feed rolls 23 and guide 22, past the forming mandrel 4 in tangential relation thereto, to a stop 21. An offset pin 4', carried upon the underside of the arbor 3', adjacent the forming mandrel, is disposed upon the side of the wire remote from the mandrel 4 so as to hold the same thereto. The gear 1 is rotated to drive the shaft 3, arbor 3' and forming mandrel 4. The wire 24 is formed around the mandrel and, simultaneously with this forming operation, the shaft 20 is caused to move downwardly which, in turn, causes the mandrel and arbor to gradually move upwardly in a vertical direction during the rotation thereof. This vertical movement is correlated with the rotation of the arbor to form a spring having any degree of pitch; e. g., a closed spring illustrated in Figure 7, or an open spring shown in Figure 8.

When the pin 15 is in position to afford no oscillatory movement of the lever 14 upon the arm 9, the setscrews 11—11' must be retracted to permit the arm 9 to move with the shaft 20 throughout its entire stroke. This arrangement corresponds to conventional types of machines, such, for example, as is shown in Patent No. 1,368,297, issued February 15, 1921, to Frank H. Sleeper, in that the arm 9 is rigid throughout to provide that each increment of rotation is accompanied by an increment of vertical movement with the arbor 3' and mandrel 4, whereby the end convolutions of the spring being formed are given the same pitch as the convolutions forming the body of the spring, and squared ends are not provided. These types of springs, made in the conventional way, are illustrated in Figures 7 and 8.

When it is desirable to provide both ends of the spring with squared ends; i. e., where the end convolutions fall in planes normal to the axis of the spring, the pin 15 is withdrawn to permit the lever 14 to reciprocate upon the arm 9, and the setscrews 11—11' are positioned in a manner similar to that illustrated in Figures 3 and 4 to limit the oscillatory movement of the arm 9. The wire is introduced in the same manner as is illustrated in Figures 5 and 6, and the rotation of the shaft 3, with its associated arbor and mandrel, is commenced. Simultaneously with this rotation the shaft 20 commences to move downwardly from the position illustrated in Figure 3. This initial movement fails to move the arm 9 from its position at the lower extreme of its stroke, whereby the first coil of wire is formed without pitch, and substantially as a closed annulus. It will be seen that the arm 9 will remain in repose until the movement of the shaft 20 returns the lever 14 from its position shown in Figure a position where its longitudinal axis is co cident with the axis of the arm 9.

At this point, it is brought into contact with the upper bearing member 16, such as is shown in Figure 1, and since the movement of the arm 9 about its pivoting stud 10 offers less resistance than does the tension of the leaf spring 17 by which the upper bearing member 16 is tensioned against the inner end of the lever 14, the arm 9 is caused to raise upwardly so as to cause the wire 24, being wound on the mandrel 4, to be laid helically therealong.

The upper setscrew 11 determines the movement of the rocker arm 9 in that direction, whereby the mandrel 4 is stopped in its upward movement, and the remaining increment of reciprocation to be performed by the shaft 20 is taken up in the lost motion of the lever 14 about its pivot 13 against the tension of the upper spring 17, such as is shown in Figure 4. During this last increment of reciprocative movement of the shaft 20, the arm 9 is stationary, but the rotation of the shaft 3 continues and causes the last convolution of the coil spring to be formed in a plane to which the axis of the mandrel 4 is perpendicular; as, a substantially closed annulus.

When it is desired to make only one end of a spring squared, either of the setscrews 11—11' is retracted so as to extend the movement of the arm 9, in its direction to the completion of the reciprocatory stroke of the shaft 20. If the bottom setscrew 11' is thus taken out of operation, the top convolution of the spring will be formed to the same pitch as the remaining convolutions, since the vertical movement of the mandrel and arbor is commenced immediately with the rotation thereof. If the top screw 11 is positioned to stop the arm 9 before the lower extreme of the reciprocatory movement of the shaft 20 is reached, the lost motion movement of the lever 14 will be effected, as is illustrated in Figure 4, whereby the bottom convolution of the spring being formed on the mandrel 4 will be squared.

By reversing the set of the screws 11—11' so that the arm 9 is constrained to remain in the position illustrated in Figure 3, while the upper limit of the reciprocative movement of the shaft 20 is reached by virtue of the lost motion movement of the lever 14 (such as is shown in Figure 3), and the top screw 11 is withdrawn to inoperative position, then the top convolution of the spring being formed will be squared, while the lower convolution will correspond to the helical disposition of the remaining convolutions in the spring (such as is shown in Figures 7 and 8).

It will be understood that many arrangements may be adopted for arresting the movement of the arm 9 before the limits of the reciprocative stroke of its actuating shaft are reached, whereby the end convolutions of a spring being formed will be squared.

While I have shown and described one specific embodiment of my invention, it will be understood that I do not wish to be limited exactly thereto, since various modifications may be made without departing from the scope of my invention, as defined by the following claims.

I claim:

1. In a machine for automatically making helical springs, means for forming a rod or wire into continuous helical convolutions, and means coordinated with said first named means for automatically forming an end convolution thereon to lie within a plane normal to the axis of said spring.

2. In a machine for making helical springs, a mandrel, means for continuously rotating said mandrel in one direction, means for moving said mandrel along its axis of rotation during the rotation thereof, and means for arresting the axial movement of said mandrel during an interval of its rotation, without interrupting the latter.

3. In a machine for making helical springs, a rotary mandrel, means for automatically moving said mandrel in an axial direction, means for automatically arresting the axial movement of said mandrel during an interval of rotation thereof, and means for rendering said arresting means ineffective.

4. In a machine for making helical springs, a rotary mandrel, means for moving said mandrel in an axial direction, said means including an oscillatory element, and adjustable means in the plane of oscillation of said element for selectively limiting the movement thereof.

5. In a machine for making helical springs, a rotary mandrel, means for moving said mandrel axially including an oscillatory element and a reciprocable member, said member being adapted to reciprocate through a fixed distance and to oscillate said element therewith, adjustable means for limiting the movement of said element to less than that required by said member, and lost motion means for connecting said member and element together.

6. In a machine for making helical springs, a rotary mandrel, means for continuously rotating said mandrel in one direction, means for moving said mandrel axially, said rotating and axially-moving means being synchronized to act upon said mandrel simultaneously, adjustable means for arresting said axial movement, and means affording continued rotation of said mandrel after the axial movement thereof has been arrested.

7. In a machine for making helical springs, a rotary spring-forming member, an oscillatory support for said member, reciprocating means for oscillating said support, and lost motion means for connecting said support and reciprocating means together.

8. In a machine for making helical springs, a stationary mounting, an arm pivoted adjacent its middle upon said mounting, a spring-forming mechanism carried by said arm adjacent one of its ends, adjustable members stationarily positioned upon each side of said arm to limit the movement thereof, and means to oscillate said arm between said members.

9. In a machine for making helical springs, a spring-forming mechanism, a movable support therefor comprising a jointed arm, and yieldable means associated therewith for retaining the portions of said arm extending to each side of the joint therein in axial alignment.

10. In combination with a spring-making machine, an arm comprising a bar element, a terminal member overlapping said bar element and being pivotally fastened thereto, yieldable means carried adjacent said overlapping portions for normally retaining said bar element and said terminal member in axial parallelism and for yieldably resisting movement of said terminal member relative to said bar element about its pivot thereon.

11. The invention according to claim 9, including means removably associated with said arm to render said joint ineffective and to make said arm unyieldingly rigid throughout its length.

12. The method of forming helical springs which includes winding a wire upon a continuously rotating mandrel, moving said mandrel axially during said winding operation, arresting said axial movement, and stopping said continuously rotating mandrel up to one revolution after arresting its axial movement.

13. The method of forming springs which includes winding a wire upon a rotating mandrel, retaining said mandrel axially until up to one convolution of wire is wound thereupon, then moving said mandrel axially during said winding operation, arresting said axial movement, and stopping said rotating mandrel within one revolution after arresting its axial movement.

14. The method of forming springs by winding wire on a rotating mandrel which includes introducing a wire to a rotatable mandrel, arranging said mandrel for axial movement coordinately with the rotation thereof, rotating said mandrel, automatically restraining the axial movement thereof during an interval of its initial rotation, and thereafter advancing said mandrel axially until the completion of the winding operation.

CARL H. PETERSON.